H. A. MYERS.
COMPUTING SCALE.
APPLICATION FILED NOV. 6, 1913.
1,280,815.
Patented Oct. 8, 1918.
3 SHEETS—SHEET 1.
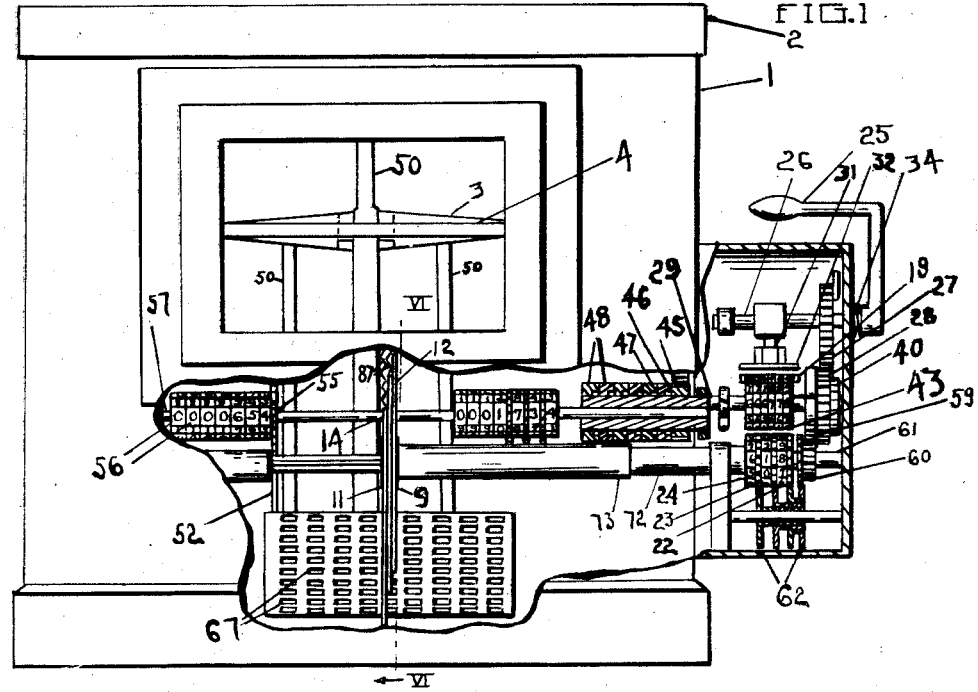
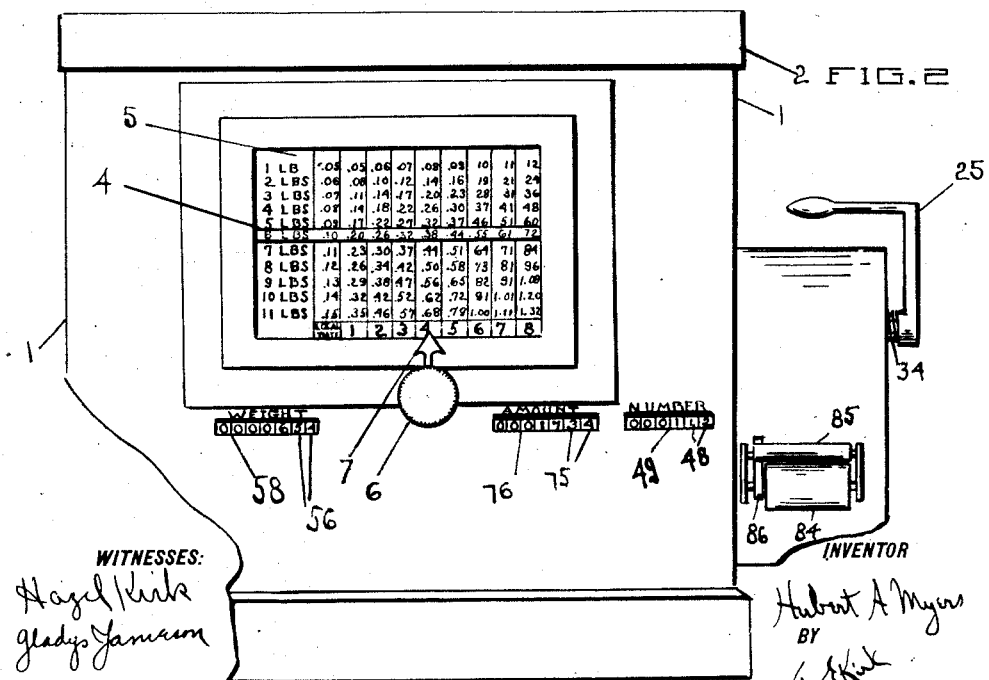

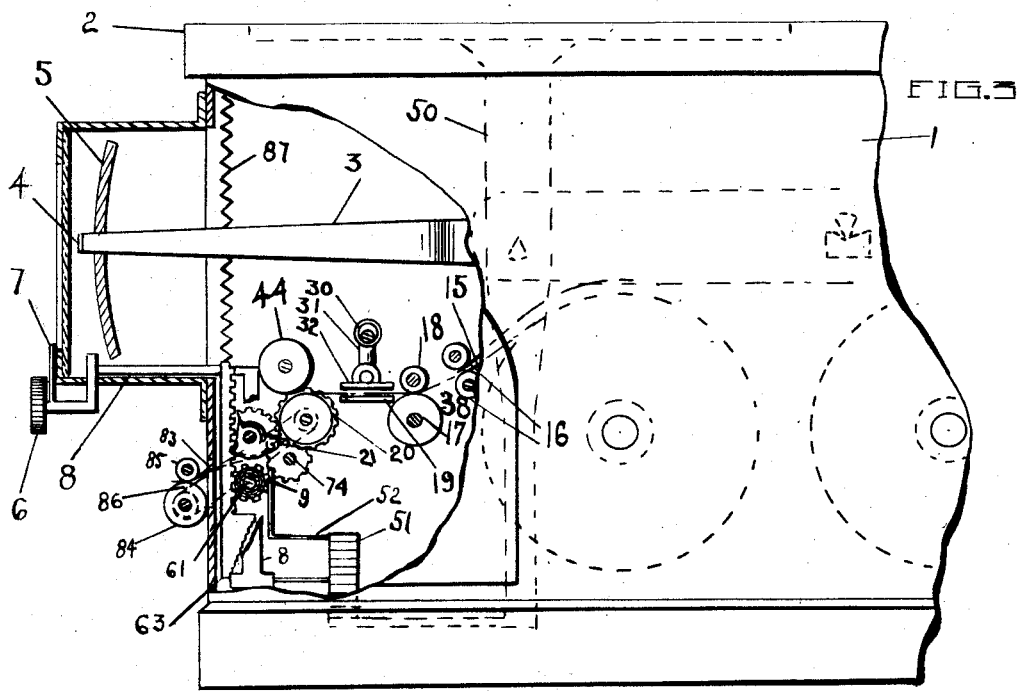

H. A. MYERS.
COMPUTING SCALE.
APPLICATION FILED NOV. 6, 1913.
1,280,815.
Patented Oct. 8, 1918.
3 SHEETS—SHEET 3.
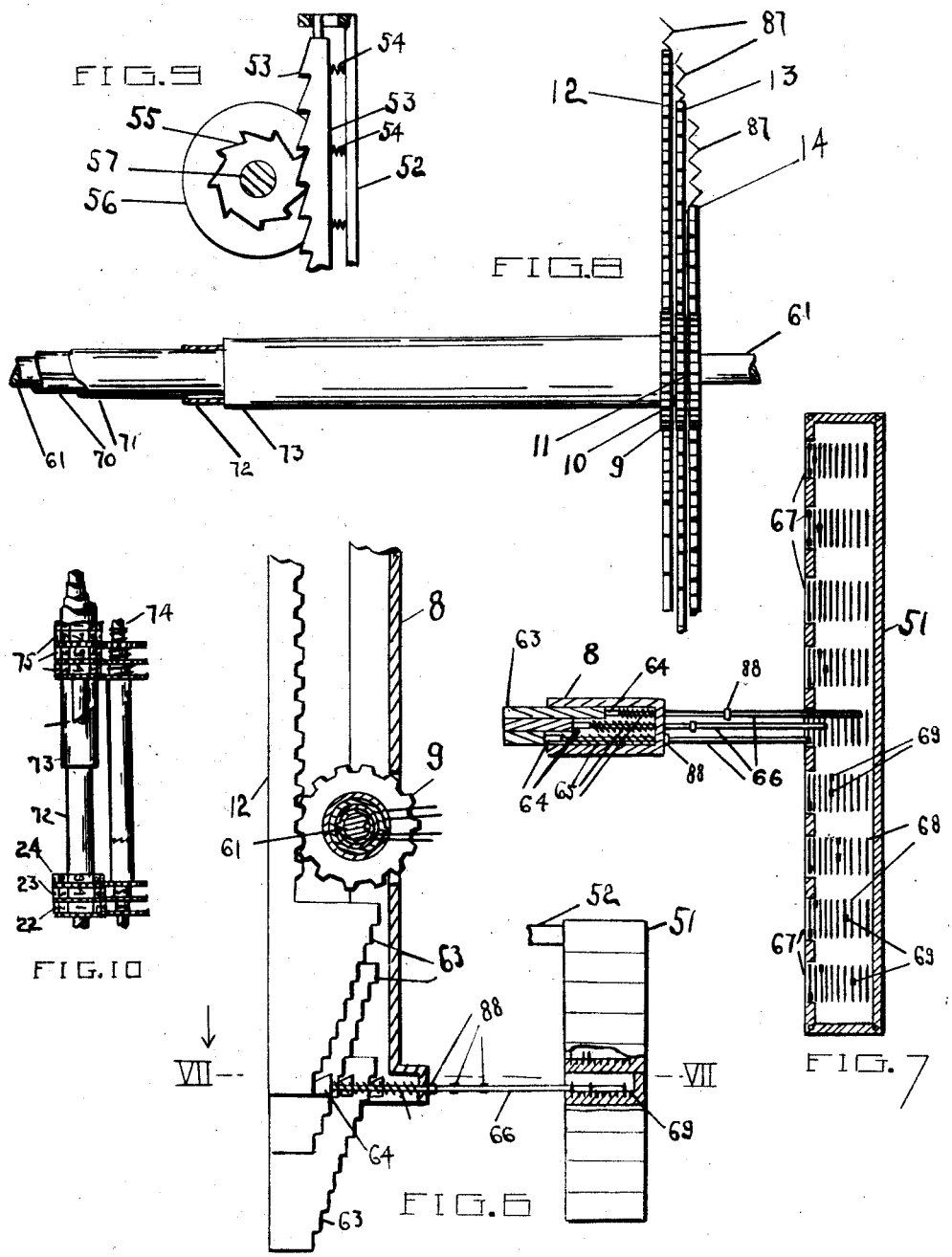

UNITED STATES PATENT OFFICE.

HUBERT A. MYERS, OF TOLEDO, OHIO, ASSIGNOR, BY DIRECT AND MESNE ASSIGNMENTS, TO TOLEDO SCALE COMPANY, OF JERSEY CITY, NEW JERSEY, A CORPORATION OF NEW JERSEY.

COMPUTING-SCALE.

1,280,815.  Specification of Letters Patent.  Patented Oct. 8, 1918.

Application filed November 6, 1913. Serial No. 799,429.

*To all whom it may concern:*

Be it known that I, HUBERT A. MYERS, a citizen of the United States of America, residing at Toledo, Lucas county, Ohio, have invented new and useful Computing-Scales, of which the following is a specification.

This invention relates to computing and recording mechanism especially adapted for use with weighing scales, and designed to determine and record weights, values, etc., where arbitrary changes can readily be effected between the weights and values, the value or price to be determined having no direct relation to the weight, as, for example in parcel post rate computations.

This invention has for its principal object to provide simple and efficient mechanism for recording, computing, and allowing the arbitrary selection of various rate computations to be utilized in connection with the weight determining mechanism of a weighing scale so that the postal rate in any given zone for a parcel of previously unknown weight can be clearly indicated and recorded.

Other objects will readily appear from the hereinafter detailed description, it being understood that while especially adapted for use in parcel post work, this invention will be found useful and may be employed in various other applications, and that many variations, modifications and changes may be made therein without departing from the spirit of the invention or the scope of the subjoined claims. Reference is to be had to the accompanying drawings illustrating a preferred form of my invention, and wherein similar reference numerals designate similar parts throughout the several views.

Referring to the drawings:—

Figure 1 is a front elevation with parts broken away of the device as incorporated for parcel post scale use; Fig. 2 is a front elevation of the device shown in Fig. 1; Fig. 3 is a side elevation with parts broken away; Fig. 4 is a view similar to Fig. 3 and showing a portion of the mechanism in enlarged detail; Fig. 5 is a detail view of the one-way drive for the strip-carrier; Fig. 6 is a detail view on an enlarged scale of the price mechanism limit determination for driving taken on the line 6—6 of Fig. 1 and looking in the direction of the arrow; Fig. 7 is a sectional view taken on the line 7—7 of Fig. 6; Fig. 8 is a detail view of the price bars and computing drive connections; Fig. 9 is a detail view on an enlarged scale of the weight totalizer drive; and Fig. 10 is a detail view with parts broken away of the amount or price totalizer drive.

The scale 1 or weight determining mechanism is provided with the platform 2 for receiving the commodities to be weighed. This movable platform 2 is suitably supported by the weighing mechanism of the scale and is arranged to shift the arm 3 and carry the bar 4 across the indicator chart 5 to disclose the weight of the commodity on the platform 2.

This weighing mechanism may be of any desired type.

It has been found advantageous to also include in combination with this weighing mechanism of the scale mechanism for computing and suitably recording the amount of postage required under the postal regulations to carry the parcel which is being weighed any given distance, and such mechanism will now be described, it being again noted that in many of such computations the price or amount of postage required bears no direct relation to the weight of the parcel, but has been arbitrarily selected by proper authorities as being a proportionate compensation for the service performed.

In the embodiment of the invention herein shown relatively arbitrary price determining mechanism is inclosed within the housing of the scale. Because of the arbitrary relation the selection of the price or rate applicable in each particular case is manually made by shifting the knob 6 to bring its pointer 7 central of the zone on the indicator chart 5 that is required in each case. By shifting the knob 6 the member 8 connected to travel therewith is laterally moved, said member 8 carrying the toothed wheels 9, 10, 11 meshing with the rack bars 12, 13, 14, which rack bars are vertically guided in their movement of the side walls of the member 8. (See Fig. 7). The lower end of each of the rack bars 12, 13 and 14 is formed with a stepped cam 63, and the vertical movement of said rack bars and their cams from their normal raised position causes the inward movement of the spring-pressed bars 66, the spring 65 encircling the bars 66 yieldingly maintaining the heads 64 thereof in contact with the stepped cams 63. (See Fig. 6).

One spring-pressed bar is provided for each of the stepped cams 63. The inward movement of these bars 66 continues until the inner end of each bar contacts with the stop member 69 which is arbitrarily placed in the path of travel of each bar 66 in any of the slots or openings 68 in the desired row or tier in the column 51, the row or tier being automatically selected through the weighing mechanism of the scale, as will be hereinafter more fully described.

The column 51 comprises an oblong box-like member having a series of vertically alined tiers or shelves with apertures 67 arranged to permit access to each of said shelves. (See Fig. 1). On each of the vertical tiers there is provided a series of horizontally alined apertures, each of said horizontal apertures being in proper alinement with one of the zones indicated on the chart 5, so that the movement of the knob 6 and its attached member 8 brings the spring-pressed bars 66 into position to enter whichever of the horizontal apertures in any of the tiers of the column 51 that is desired in each particular case, the aperture 67 being of sufficient width to receive the three bars 66, as shown in Fig. 7. The vertical tier of the column 51 is governed by the weight of the parcel placed on the platform 2 of the scale, the weighing mechanism operating to offset the weight of the parcel and in so doing lowers the members 50 (shown in dotted lines in Fig. 3), simultaneously lowering the column 51 which is suitably secured to the members 50. It will be evident that the greater the weight of the parcel the farther will the column 51 descend. Within each of the apertures 67 are arranged a plurality of alined slots or openings 68 (see Fig. 7) of sufficient width to receive three of the stop members 69, the stop members being arbitrarily placed within any slot of the series and one of said stop members being arranged to block the path of travel of each of the spring-pressed bars 66, as clearly shown in Fig. 7. The placing of the stop members 69 is designed to be in accordance with the prices necessary for any given zone at the weight which when placed on the platform 2 will bring any particular tier of openings 67 into alinement with the bars 66.

The desired zone having been selected by the shifting of the knob 6, and the required tier brought into proper alinement through the weighing mechanism of the scale the mechanism for computing the price or rate required for the parcel on the scale platform is set and will be brought into operation for indication and recording upon movement of the hand lever or arm 25 as will be hereinafter described.

In the device as herein disclosed, a printed slip or special stamp, say supplied as a strip 15 from a roll, may be furnished. This strip 15 is shown as fed between the pair of rollers 16 and drawn by the roller 17 opposing the roller 18. Thence the strip may pass over the printing or impressing plate 19 where it may be printed, embossed or perforated, say by the device indication or identification, for instance, a postal station number.

As passing over a roller 20 each progression may be regarded as a unit to be tallied up in counting the number of stamps put out by the station. The guide roller 21 then directs the strip directly over the adjacent rollers 22, 23, 24, carrying type for impressing or marking on the strip respectively the dollars, dimes and cents.

With the desired zone selected by the shifting of the knob 6 and the scale acting to determine the weight of the parcel or commodity, the arm 25 may be pulled forward for full stroke action. The arm 25 is mounted on the shaft 26 which carries the toothed segment 27 in mesh with the gear 28 loosely mounted on the shaft 29. Fast on the shaft 26 is the eccentric 30 engaged by a link 31 effective to force the block 32 toward the plate 19 to effect the impression therefrom on the under side of the strip.

During the latter portion of the pull forward of the arm 25 the segment 27 is in mesh with the toothed wheel 33. Upon release of the handle 25 after the full pull forward, the spring 34 above the shaft 26 returns the arm 25, as well as the shaft 26 and the segment 27, to the initial position. On this return travel the pawl 35 carried by the wheel 33 is forced by the spring 36 into driving engagement with the ratchet wheel 37 fast on the shaft 38, on which shaft 38 the wheel 33 is loosely mounted, thereby partially rotating the shaft 38 and the roller 17 mounted thereon to advance the strip 15. The length of the return drive of the wheel 33 is gaged by the segment 27 to be the feed distance for the strip 15 as determined by the stamp or slip length desired. The strip feed is effected by the roller 17 fast on the shaft 38.

It may be advantageous to count and record the number of advances of the strip 15, printing the number of each slip thereon as it is issued. In the present embodiment, this counting is accomplished by the pawl 39 on the segment 27 engaging the ratchet wheel 40 fast on the shaft 29 during the return travel of the segment 27 and the arm 25. The lug 41 on the segment 27 limits the swing of the pawl 39 in one direction by engaging the lug 42 on the pawl 39, so the pawl is held in position to engage the ratchet wheel 40 for a unit count travel during the return of the arm 25. The recording counting disks 43 may co-act to mark the strip 15 while held in contact by the opposing roller 44. For indication of the counting, the shaft 29 carries the gear 45 in mesh with a similar gear 46 on the sleeve 47 carrying the counting disks 48 driven by the gear 46 and displaying number total of weighings or stamps through the opening 49 in the scale housing (Fig. 2).

For indicating the total weight of the parcels weighed on the scale, the platform 2 through the weighing mechanism of the scale moves the member 50 carrying the column 51 from which extends the bar 52 holding the ratchet bar 53 by the springs 54 yieldably against the ratchet wheel 55 fixed to drive the weight totalizing disks 56 on the shaft 57, the total being visible through the opening 58 in the scale housing.

During the pull forward of the arm 25 the price or rate determining mechanism is driven by the segment 59 fast with the gear wheel 28 loosely mounted on the shaft 29. The segment 59 is in mesh with the pinion 60 loosely mounted on the shaft 61 but having friction sleeve extensions 62 for yieldably driving the type-carrying price-recording disks 22, 23, 24. The disk 22 is fast on the shaft 61 on which is splined the toothed wheel 11 (see Fig. 8). Accordingly, as the disk 22 is urged to rotate, through the yieldable transmission 62, the shaft 61 causes the wheel 11 to drive the rack bar 14 downward. In its travel downward, this rack bar carries with it its stepped cam 63 to force the head 64 against the resistance of the spring 65 to move the bar 66 against the limit stop member 69 as arbitrarily set therefor in the desired slot 68 in the desired tier in the column 51, as previously pointed out. The movement of the bar 66 is terminated when its inner end contacts with the stop member 69 placed in its path of travel, the head 64 thereof preventing further downward travel of the rack bar 14, locking the toothed wheel 11 meshing therewith, continued rotation of the disk 22 being prevented because of the locking of the toothed wheel 11, the yieldable gearing 62 taking up further driving movement. The sleeve 70 connected to the disk 23 is splined to the sleeve 71 engaging the toothed wheel 10. The sleeves are loose upon the shaft 61. As described above in connection with the disk 22, driving movement limit is determined for the intermediate counting disk 23 from the travel stop position of the rack 13. The sleeve 72 connected to the disk 24 has splined driving connection to the sleeve 73 fast with the toothed wheel 9 meshing with the rack 12, and its driving movement limit is similarly determined. These sleeves 72 and 73 are loosely mounted on the sleeves 70 and 71 carried by the shaft 61. The travel limit of the type carrying disks is similarly determined. The particular opening into which the bars 66 are to be forced is determined by the downward travel of the column 51 in its step-by-step movement as governed by the platform load, while the shifting of the knob 6 selects the zone opening for such weight. The stops 69 disposed in the several openings 68 in accordance with the chart 5 determine the price in units, tens and hundreds. For totalizing the amount of the rates printed on the several slips issued, the countershaft 74 (Fig. 10) is provided with gears and sleeves for yieldably driving the counting disks 75 on the shaft 57 from the disks 22, 23 and 24 to give indication through the opening 76 (Fig. 2).

For printing or otherwise recording the amount for each slip as fixed by type disk travel, the segment 59 carries the lug 77 engaging the plunger 78 for lifting the same by contacting the projection 79 thereon. As the lug 77 passes the projection 79, the plunger 78 is forced downward by the spring 80 and has its after edge 81 sever the strip, while the force of the blow produces the desired clear impression of value from the type positioned on the disks below the strip. The return movement of the segment 59 is permitted by the springs 82 allowing the plunger to be forced out of line of the travel of the lug 77. This movement starts the strip down the chute 83 to be drawn between the rollers 84, 85 as driven by the belt 86 from the shaft 29. The return travel of the segment 59 permits the racks 12, 13, 14 to return to their initial raised positions, the coil springs 87 sustained from the upper portion of the member 8 assisting in raising these racks and maintaining them in their normal elevated positions. This permits the spring 65 to withdraw the rods 64 from the openings 67 in the column 51 as limited by the stops 88 carried by the rods. The device is then in position for a second weighing and computing. The one-way transmission on the shaft 74 allows recovery of the disks 22, 23, 24 to zero position, but permits the totalizing disks 75 to remain unchanged.

What is claimed and it is desired to secure by Letters Patent is:

1. In a device of the character described, a weight determining mechanism, relatively arbitrary price determining mechanism coöperating therewith, shiftable selecting means for positioning the mechanisms relatively to each other and carrying a plurality of stepped bars, and recording means actuated from one of said determining mechanisms for recording the price determined by the coöperation of said mechanisms.

2. In a device of the character described, a weight determining mechanism, relatively shiftable price determining mechanism cooperating therewith and carrying a plurality of stepped bars, means for recording the price determined by the coöperation of said mechanisms, and driving means for one of said mechanisms effecting recording by actuation of the recording means.

3. A parcel post computing device embodying weight determining mechanism, selectable price determining mechanism coöperating therewith and including a plurality of shiftable stepped bars, recording means for recording the price determined by the coöperation of said mechanisms, and driving means for one of the mechanisms effecting recording of the price for the weight determined.

4. A parcel post stamp producing device embodying weight determining mechanism, selectable price determining mechanism coöperating therewith and including a plurality of shiftable stepped bars, a strip-carrier, recording means for recording the price determined by the coöperation of said mechanisms, and driving means co-acting with the strip-carrier, recording means, and one of said mechanisms.

5. A parcel post stamp producing device embodying weight determining mechanism, price determining mechanism coöperating therewith and including a plurality of shiftable stepped bars, a weight totalizer actuated from the weight determining mechanism, and driving means for the price determining mechanism.

6. A stamp producing device embodying weight determining mechanism, price determining mechanism coöperating therewith and including a plurality of shiftable stepped bars, a weight totalizer actuated from the weight determining mechanism, driving means for the price determining mechanism, and price totalizing means actuated from the price determining mechanism.

7. In a device of the character described, a weight determining mechanism, selectable price determining mechanism coöperating therewith and including a plurality of shiftable stepped bars, recording means for effecting recording of the price determined, driving means for the price-determining mechanism and the recording means, and a totalizer for the price determining mechanism actuated by said driving means.

8. In a device of the character described, a weight determining mechanism, selectable price determining mechanism coöperating therewith and including a plurality of shiftable stepped bars, recording means for effecting recording of the price determined, a totalizer for the price determining mechanism, and driving means for one of the mechanisms arranged to actuate said recording means and said totalizer.

9. In a device of the character described, a weight determining mechanism, adjustable price determining mechanism adapted to coöperate therewith and including a plurality of shiftable stepped bars, driving means for actuating the price determining mechanism, and means for recording the price determined, said means being actuated by the driving means.

10. In a device of the character described, a weight determining mechanism, adjustable price determining mechanism adapted to coöperate therewith and including a plurality of shiftable stepped bars, driving means for actuating the price determining mechanism, and means for indicating and recording the price determined, said means being actuated by the driving means.

11. In a device of the character described, a weight determining mechanism, adjustable price determining mechanism adapted to coöperate therewith and including a plurality of shiftable stepped bars, driving means for actuating the price determining mechanism, means actuated by the driving means for recording the price determined, and a counter for indicating the number of prices determined.

12. In a device of the character described, a weight determining mechanism, adjustable price determining mechanism adapted to coöperate therewith, and including a plurality of shiftable stepped bars, driving means for actuating the price determining mechanism, means actuated by the driving means for recording the price determined, and means for counting and recording the number of prices determined, said means being actuated from said driving means.

13. In combination with a weight determining mechanism, price determining mechanism including a member having a plurality of vertical tiers of horizontally alined openings therein, automatic means for selecting one of the vertical tiers, and manually operated means for selecting one of the horizontal openings in the selected tier.

14. In combination with a weight determining mechanism, price determining mechanism including a member having a plurality of vertical tiers of horizontally alined openings therein, automatic means for selecting one of the vertical tiers, and manually operated means for selecting one of the horizontal openings in the selected tier, price indicating mechanism, and means for actuating said price indicating mechanism after said automatic and manual selections have been made.

15. In combination with a weight determining mechanism, price determining mechanism including a member having a plurality of vertical tiers of horizontally alined openings therein, automatic means for selecting one of the vertical tiers, and manually operated means for selecting one of the horizontal openings in the selected tier, price indicating mechanism, and means for actuating said price recording mechanism after said automatic and manual selections have been made.

16. In combination with a weight determining mechanism, price determining mechanism including a member having a plurality of vertical tiers of horizontally alined openings therein, automatic means for selecting one of the vertical tiers, and manually operated means for selecting one of the horizontal openings in the selected tier, price indicating mechanism, price recording mechanism, and means for actuating the price indicating and price recording mechanism after the said automatic and manual selections have been made.

17. In a device of the character described, weight determining mechanism, price determining mechanism coöperating therewith, and including a member having a plurality of vertical tiers of horizontally-alined openings therein, means actuated by the weight determining mechanism for adjusting said member to bring one of the horizontally-alined openings therein in operative position, manually operated means for adjusting the price determining mechanism with relation to the vertical tiers, and driving means for actuating the price determining mechanism after said adjustments have been made.

18. In a device of the character described, weight determining mechanism, price determining mechanism coöperating therewith, and including a member having a plurality of vertical tiers of horizontally-alined openings therein, and a plurality of alined slots arranged behind each of said openings, removable stop members insertible in any of said slots, means actuated by the weight determining mechanism for adjusting said member to bring one of the horizontally-alined openings therein in operative position, manually operated means for adjusting the price determining mechanism with relation to the vertical tiers, and driving means for actuating the price determining mechanism after adjustments have been made.

19. In combination with a weight-determining mechanism, price-determining mechanism including a member having a plurality of horizontally alined openings therein, shiftable selecting means carrying a plurality of stepped bars, and means for actuating the price-determining mechanism after the selection has been made.

20. In combination with a weight-determining mechanism, price-determining mechanism including a member having a plurality of vertical tiers of horizontal openings therein, shiftable selecting means carrying a plurality of stepped bars, and means for actuating the price-determining mechanism after the selection has been made.

In witness whereof I affix my signature in the presence of two witnesses.

HUBERT A. MYERS.

Witnesses:
 GEO. E. KIRK,
 GLADYS JAMESON.